United States Patent [19]
Roth et al.

[11] 3,901,976
[45] Aug. 26, 1975

[54] THIXOTROPIC LIQUID FEED SUPPLEMENTS FOR RUMINANTS OF CARBOHYDRATES, NPN AND CLAY

[75] Inventors: Harold H. Roth, Bay City; Frank L. Saunders; Hamish Small, both of Midland, all of Mich.

[73] Assignee: The Dow Chemical Company, Midland, Mich.

[22] Filed: Apr. 2, 1973

[21] Appl. No.: 348,015

Related U.S. Application Data

[63] Continuation-in-part of Ser. No. 236,182, March 20, 1972, abandoned.

[52] U.S. Cl. .............. 426/69; 426/213; 426/74; 426/220; 426/423; 426/807; 71/64 C
[51] Int. Cl.² ... A23K 1/02; A23K 1/18; A23K 1/22
[58] Field of Search ....... 420/69, 74, 213, 330, 423, 420/807, 218, 220, 215, ; 71/1, 26, 64 C

[56] References Cited
UNITED STATES PATENTS

| | | |
|---|---|---|
| 3,179,496 | 4/1965 | Skinner et al. ............... 71/34 X |
| 3,234,004 | 2/1966 | Smith et al. ............... 71/28 |
| 3,234,005 | 2/1966 | Smalter et al. ............... 71/29 |
| 3,248,224 | 4/1966 | Loomis et al. ............... 99/2 ND |
| 3,325,289 | 6/1967 | Lyons ............... 99/2 |
| 3,420,672 | 1/1969 | Appleman ............... 99/2 ND |
| 3,484,243 | 12/1969 | Anderson et al. ............... 99/2 |
| 3,523,798 | 8/1970 | Kail ............... 99/6 |
| 3,676,100 | 7/1972 | Gerhardt ............... 71/64 C |

*Primary Examiner*—Norman Yudkoff
*Assistant Examiner*—Curtis P. Ribando
*Attorney, Agent, or Firm*—Theodore Post; C. Kenneth Bjork

[57] ABSTRACT

Disclosed and non-Newtonian thixotropic liquid feed supplements for ruminant animals containing a liquid feed supplement medium, a dispersant-treated clay system, and various soluble and insoluble feed additives. Also disclosed are methods for preparing such supplements and feeding the same to animals.

26 Claims, No Drawings

3,901,976

THIXOTROPIC LIQUID FEED SUPPLEMENTS FOR RUMINANTS OF CARBOHYDRATES, NPN AND CLAY

CROSS-REFERENCE TO RELATED APPLICATION

The present application is a continuation-in-part of our copending patent application Ser. No. 236,182, filed Mar. 20, 1972 and now abandoned.

BACKGROUND OF THE INVENTION

The present invention relates to thixotropic liquid feed supplements and to methods for their preparation and use. More specifically, the invention relates to a thixotropic liquid feed supplement produced upon mixing a liquid feed supplement medium and a dispersant-treated aqueous clay slurry.

Liquid feed supplements for ruminants, particularly for diary or beef cattle and sheep, are known and have been used commercially in the United States for a number of years. For reasons of effectiveness and economy of manufacture, it has been found desirable to prepare such supplements employing non-protein nitrogen sources (hereinafter referred to as "NPN") such as urea and carbohydrate sources such as molasses.

Several difficulties, however, have attended the use of NPN derivatives such as urea in liquid feed supplements. Among these are the possibility of ammonia poisoning because of the very rapid solubility of urea and its accompanying decomposition to ammonia. This results in an increased infusion of ammonia into the blood stream at levels greater than the body can tolerate. Thus, free choice or ad libitum methods of feeding cannot safely be employed. Furthermore, even if the toxic threshold was not reached, too rapid diffusion of ammonia may result in excessive excretion of ammonia through the kidneys and hence lower the efficiency of utilization of a NPN source. Acclimation techniques, whereby gradually increasing amounts of urea are fed to an animal over a period of time are thus sometimes employed to avoid such problems. Such procedures, however, are generally not practicable for feed lot animals due to the length of time required to acclimate them. These difficulties thus have the effect of limiting the amount of urea that may typically be added to the ration. Further, close control over animal consumption is also required, especially when incorporated with highly palatable molasses.

A second difficulty attending the use of urea in liquid feed supplements arises from the crystallizing or salting out characteristics of urea in stock solutions as well as completed supplements. The urea phase of a completed supplement may also stratify in farm storage; the resulting lack of uniformity in the product can result in excessive consumption of urea and result in ammonia poisoning as set forth above.

Other NPN sources, such as, for example, biuret are considerably less toxic than urea and have been employed widely in dry feed supplements. While biuret is preferred as an NPN source because of its low toxicity, it has the disadvantage of being highly insoluble and thus unsuitable for liquid feed supplements where all ingredients are preferably maintained in solution to insure uniform supplement intake by an animal and provide most efficient feed utilization.

The practice of feeding molasses to cattle and sheep ad libitum as an energy source is also well known. Whether fed by itself or in combination with other ingredients the supplement molasses is disadvantageous. A primary restriction is the high palatability of the molasses itself which causes animals to consume excessive amounts exceeding the point of most efficient feed utilization. This is especially true where native feeds are in short supply, it being well established that the consumption of molasses by cattle will increase considerably under these conditions.

Animal-vegetable fats or oils (hereinafter referred to as "fats and oils"), including fatty acids and acidulated fats, soap stocks, and oils are also desirable for feeding to animals for a variety of reasons. In general, the fats or oils have high energy value and are important nutritionally to the well-being of the animal. Some animals will eat more fat or oil than their diet calls for when it is readily available. Moreover, certain fats and oils are not palatable and animals tend to ignore the same. Additionally, fats and oils tend to separate when mixed with molasses and float on top; this is disadvantageous for the reasons just noted. Also, certain fats or oils tend to become rancid upon exposure to air even if antioxidants have been added thereto if sufficient time elapses.

For the foregoing reasons, it would be desirable to provide liquid supplements wherein livestock edible, water-insoluble fats and oils, NPN sources, minerals and other feed additives can be maintained in a uniform liquid suspension. It would also be desirable to provide liquid supplements wherein soluble NPN sources can be maintained in uniform solution or suspension without phase separation or crystallization and sedimentation. It would further be desirable to provide liquid supplements, including those containing only livestock edible fats and oils or a highly palatable carbohydrate source, such as, for example, molasses, wherein consumption of the supplement can be controlled at desired levels so as to avoid harmful effects on an animal and achieve efficient and economical utilization of the supplement.

SUMMARY OF THE INVENTION

According to the present invention, substantially all of the above-described problems and difficulties are substantially overcome or eliminated by utilizing aqueous clay slurries treated with relatively optimal amounts of clay dispersants to form highly viscous, thixotropic liquid feed supplements. It has now been discovered that thin, fluid aqueous clay slurries containing relatively optimal amounts of clay dispersants, when mixed with a suitable liquid feed supplement medium containing an acid and/or a polyvalent cation source, produce stable thixotropic systems of high viscosity. Suitable liquid feed supplement mediums include, for example, molasses, solutions of water soluble carbohydrate sources, and the like and admixtures thereof. Soluble and insoluble active feed sources such as, for example, minerals, NPN sources, fats and oils, and a wide range of other additives can be incorporated therein.

It will be appreciated that the optimum content of the various ingredients of a liquid supplement may vary depending on the particular use to be made of the supplement. For example, a supplement for diary cattle will usually be formulated differently than a supplement for beef cattle or sheep. Moreover, since the supplement forms only a part of the total ration, it will also usually be desirable to tailor the supplement to the content of the total ration. If the animal is being fed high nitrogen roughage, the NPN source of the supplement can be reduced, etc.

In the present invention, the dispersant-treated clay slurries and the liquid feed supplement medium with which it is mixed perform a number of functions, and provide several interrelated advantages in the preparation, storage and use of the liquid supplements. In this respect, molasses provides a cheap and ready source of energy and contains ionizable compounds such as edible and water soluble mineral compounds; amino acids and other organic acids; the sulfates, sulfites, chlorides, silicates and phosphates of potassium, sodium, calcium and magnesium; the formates, acetates, propionates, citrates, pyruvates; and the acids of the citric acid cycle. Consequently, when a thin fluid clay slurry is mixed with molasses, it is believed that the inherent thickening properties of the clay are recovered and a highly viscous thixotropic system is formed through the action of the molasses pH and/or the polyvalent cations contained therein upon the clay. Soluble sources of acids and/or polyvalent cations, which also possess nutritional value, can thus be incorporated, where necessary, into liquid feed supplement mediums palatable to animals and mixed with the thin, aqueous clay slurries to similarly recover the thickening effect of the clay and obtain viscous, thixotropic supplements.

In the application of this invention the advantages of an optimally dispersant-treated clay slurry are two-fold: (1) the preparation, handling and transportation of the clay slurry is greatly improved, and (2) the resultant prepared clay slurry is surprisingly effective in producing viscous, thixotropic liquid systems in which NPN sources and other additives can be incorporated and fed free-choice to animals.

Although there are a variety of mixing techniques and steps that may be utilized in the preparation of the liquid feed supplements of the present invention, it is generally preferred to incorporate an optimum amount of clay dispersant in water and next add the clay thereto slowly with agitation. The clay slurry thus formed is then subjected to shearing agitation in order to insure good dispersion of the clay particles. Preferably, the sheared clay slurry is then introduced into the liquid feed supplement medium in a zone of high shear and sheared until a smooth, homogenous formulation is produced. Insoluble nutritional feed sources, such as, for example, NPN sources, e.g., biuret, insoluble minerals, insoluble fats and oils, and the like are preferably incorporated after the homogeneous formulation is prepared. Soluble non-protein nitrogen sources and one or more of a variety of water-soluble ingredients for biochemically nutritional and other purposes such as anti-bacterial (preservative) agents, vitamins, antibiotics, minerals, hormones and water-soluble antioxidants can also be incorporated into the liquid feed supplement medium or can be dissolved in water with the dispersant and then mixed with the clay.

The thixotropic liquid feed supplements of the present invention are stable and can be stored for long periods of time with little settling of solids suspended therein or phase separation. Liquid feed supplements containing attapulgite clay and biuret exhibited no sedimentation after a period of 30 days.

DETAILED DESCRIPTION

Suitable non-protein nitrogen sources which can be employed in accordance with the present invention include urea, biuret and ammonium salts such as ammonium sulphate or ammonium phosphate. The non-protein nitrogen source employed in the present invention can be ordinary feed grade biuret or urea supplied in solid form. Solutions of urea can also be employed. Feed grade biuret usually comprises from about 60 to about 85% biuret, the remainder being predominately urea with small amounts of triuret and cyanuric acid. Insoluble minerals and elements necessary for good animal nutrition and which can be employed in the feed supplements of the present invention include magnesium oxide, calcium oxide, calcium carbonate, sulfur, and the like. Protein materials, such as albumen, gelatin, casein, legumes, soybean, peanut and cottonseed proteins and the like, as well as cellulosic materials can also be incorporated in the supplements of the present invention.

Preferably, molasses is employed as the palatable liquid feed supplement medium for the supplements of the present invention because of its low cost and availability. Carbohydrate solutions which are palatable to animals can also be employed as liquid feed supplement mediums in the present invention in combination with a soluble acid and/or a soluble source of polyvalent cations. Such liquid carbohydrate solutions also include starches, dextrins, pectins or sugars, such as, for example, araginose, xylose, glucose, fructose, sucrose, maltose, lactose and the like.

The fats and oils employed in the present invention are those livestock edible water-insoluble fats and oils (hereinafter referred to in the specification and claims simply as "fatty material") derived from animal and vegetable sources and vary in consistency from liquids to solids at room temperature. Most water-insoluble animal and vegetable oils are mixtures of distinct triglycerides, i.e., glyceryl esters of stearic, palmitic, oleic, and other acids. The viscosity of the particular fatty material employed depends upon the relative proportions of the various esters that are present therein. The esters have fairly wide differences in melting point.

Livestock edible fatty materials are derived from a very wide variety of sources. Some of the most important fatty materials are listed below:

Soybean oil or soybean oil tailings or residue.
Cottonseed oil or cottonseed oil tailings or residue.
Sesame oil or sesame oil tailings or residues.
Olive oil or olive oil tailings or residues.
Corn oil or corn oil tailings or residues.
Grease, such as reclaimed restaurant fats, and greases.
Tallow.
Fish oil.
Beef fat or other animal fat.
Deodorized sewage fat.

It is also found that soap stock (which is the residue left after the animal and vegetable fats or oils have been treated with alkali to make soap), when treated with acid forms fatty acids which are palatable to animals. These fatty acids (which are known in the feed industry as acidulated soap stocks, acidulated fats and acidulated oils) are inexpensive and can be used in the present invention.

The molasses can be any commercial molasses product, such as those obtained as by-products of the processing of sugar beets, sugar cane, corn (e.g., hydrol) or wood. Ordinarily, molasses is not completely dried but is produced and shipped as a concentrated water solution which is well-adapted for use in the present invention. It will be understood that the water content of the molasses, as well as other sugar, starch, dextrin and pectin solutions, should be considered in determining the overall formulation of the supplement. The molasses employed in the present invention has a consistency varying from a thin to a thick syrup and normally falls within the range of 50-90 Brix. Preferably, the molasses and other carbohydrate solutions employed are from about 65 to about 85 Brix. In a further preferred embodiment, molasses of from about 70 to 80 Brix is employed.

The molasses or other carbohydrate solutions are used in amounts sufficient to yield a supplement having a pH generally between about 2.5 and 8.0. Usually, the molasses or other carbohydrate solutions comprise from about 30 to about 70 percent of the finished supplement. Fats and oils can be incorporated into the supplements in amounts ranging from about 5 to about 20% or more by weight of the supplement.

The acids employed in the present invention are those that are water soluble and livestock edible and are derived from a wide variety of sources. Thus, acids, such as, for example, phosphoric, sulfuric and the like can be employed. Such acids also provide nutritional sources of phosphorous and sulfur. Polyvalent cations, such as, for example, $Mg^{++}$, $Ca^{++}$, $Zn^{++}$, $Fe^{++}$, $Fe^{+++}$ and $Mn^{++}$ are derived from the corresponding soluble chloride, sulfate, etc., salts. Thus, soluble sources such as lime, hydrated lime, $FeCl_2$, $CaCl_2$, $Ca(NO_3)_2$, $MnSO_4$, $ZnCl_2$, alkaline earth salts of acids such as formic, acetic, carbonic, sulfuric, hydrochloric and the like can be employed. Mixtures of acids and polyvalent cation source can also be employed. Acids are generally employed, where necessary, in amounts ranging from about 0.5% to 5.0% by weight of the finished supplement. The polyvalent cation source is employed in minimal amounts; usually amounts sufficient to provide from about 0.01 to 0.1% by weight of the polyvalent cation in the finished supplement are employed. Such amounts of acid and polyvalent cation source are sufficient to obtain maximum thickening effects of the clay in the finished supplement, although greater amounts may be employed for nutritional purposes.

The clays employed in the present invention include bentonite clays and attapulgites, e.g., clay minerals known as fuller's earth. Swelling bentonite clays, such as hectorite and Wyoming bentonite, may be used in carrying out the invention. Sepiolite clay, which is generally similar to attapulgite clay, may also be employed when available.

The quantity of clay employed in producing the thickened feed supplement is generally from about 0.5% to about 5.0% based on the weight of the finished formulation. Preferably, the quantity of clay employed in the finished supplement is from about 0.75 to about 4.0% by weight. The clay slurry pre-mixes employed in the present invention usually contain from about 5 to about 35% by weight clay solids. Preferably, clay slurries containing from about 10 to about 30% by weight clay solids are employed.

Maximum dispersion of the clay in water to form the slurry pre-mix is accomplished by employing a dispersing agent, such as, for example, soluble salts, e.g., sodium, potassium, ammonium and the like, of tripolyphosphate, pyrophosphate and other polyphosphates. Organic dispersants can also be employed in the present invention. Thus, for example, the sodium salt of polymeric carboxylic acids (sold under the trademark of Tamol 731 by Rohm & Haas Co., Philadelphia Pa.) can be employed. Depending upon the type of clay employed, the optimum amount of dispersant (i.e., that amount which produces the minimum viscosity of the sheared slurry) is usually employed in amounts from about 1.0 to about 20% by weight (based on the quantity of clay). When attapulgite clays are employed, the slurries are prepared to contain from about 10 to about 35% by weight and the phosphate dispersant is employed in amounts from about 1.5 to about 4.0%. In a preferred embodiment, 30% by weight attapulgite clay slurries are employed with the phosphate dispersant being present in amounts from about 1.5 to about 2.0% by weight (based on the clay). In an additional preferred embodiment, 20% by weight attapulgite clay slurries are employed with the phosphate dispersant being present in amounts of about 3.0% by weight (based on the clay).

When bentonite clays are employed, the slurry clay densities are preferably from about 10 to about 15% by weight and the phosphate dispersant is employed in amounts from about 10 to about 16% by weight (based on the clay). In a further preferred embodiment, bentonite slurries of about 10% by weight clay and containing from about 12 to about 16% by weight of the phosphate dispersant (based on the clay) are employed.

In preparing the clay slurry pre-mixes, it is essential that an optimum amount of dispersant be employed for the particular clay utilized. When too little dispersant is used, the clay slurry cannot be prepared at a high percent solids density because of unmanageable thickness. Such slurries further have reduced thickening effectiveness in preparing a thixotropic system. While slurries of lower solids density can be prepared, such slurries are not economical to prepare and transport. Conversely, when too much dispersant is used, the clay slurry becomes more difficult to prepare because of unmanageable thickness at high solids density. It is also essential that the clay be adequately sheared when mixed with the water. When the clay is not adequately dispersed, i.e., sheared, the clay slurry is not as effective in the preparation of a thickened highly viscous system. Alternatively, the clay pre-mix may be aged for periods of from about 10 to about 16 hours or more in lieu of shearing.

In preparing a thickened supplement from the clay slurry pre-mix, it is essential that the clay slurry be blended into the liquid supplement feed medium in a zone of high shear to obtain the maximum thickening action of the clay. Too little shearing action during the blending produces less effective thickening and results in a supplement having a lower viscosity than desired. This is especially so when clay slurries above about 10% solids density are employed.

The liquid supplements thus prepared are psuedoplastic non-Newtonian systems, i.e., they are thick and highly viscous when at rest but become fluid upon agitation. When agitation of the formulation is arrested, the formulation reverts to a thick, highly viscous state.

The thixotropic formulations obtained in this manner are thus used to stably suspend or maintain in uniform solution minerals, proteins, non-protein nigrogen sources, fats or oils and the like, which are either highly insoluble or tend to crystallize out of solution. The supplements prepared contain a minimum amount of clay therein while desired maximum viscosities are obtained; thus only minimum dilution of the liquid feed supplement medium to produce the desired viscosity is required.

Soluble additives can be incorporated into the liquid feed supplement medium and mixed with the clay slurry or can be dissolved in water with the clay dispersant, including the acid or polyvalent cation source, where necessary, and mixed directly with the clay to obtain a viscous thixotropic supplement. Additives which are insoluble are incorporated by agitation into the viscous supplement obtained following the addition of the clay slurry pre-mix. The mixture need only be agitated until the insoluble additive is thoroughly dispersed and suspended.

When an insoluble solid additive, such as biuret, is incorporated, high supplement viscosities are required to maintain the solid insoluble additive in suspension. Usually biuret prills of from about 20 to about 120 mesh are employed. Preferably, biuret prills ranging in size from about 40 to about 120 mesh or smaller are employed. When using biuret prills ranging in size from about 20 to about 120 mesh, supplement viscosities of from about 30,000 cps to about 120,000 cps (Brookfield LVT, 0.3 RPM) are required to maintain the biuret in suspension. Preferably, the viscosities of the liquid supplements are between about 50,000 cps and about 100,000 cps (Brookfield LVT, 0.3 RPM).

Generally, consumption of a supplement containing from about 5 to about 60% crude protein equivalent is desirably held to a rate between about 0.5 to about 4.0 lbs/head/day. The incorporation of from about 10 to about 30% by weight of NPN in the finished supplement provides the required crude protein equivalent. The liquid feed supplements of the present invention are adapted to be fed during all seasons. Preferably, the supplements contain sufficient amounts of an antifreeze substance such as, for example, propylene glycol, calcium chloride, sodium chloride and the like, to maintain the freezing point of the supplements well below 0°F. when employed in relatively cold climates.

The liquid feed supplements of the present invention can be presented to animals in standard bulk liquid feeders employing a "licker" wheel assembly. Typical liquid feeders are available from various sources, such as the Hold 'Em Gate Company, Inc., Industrial Park, Gainesville, Tex. As the animal licks and turns the wheel of the feeder, which is partially immersed in the supplement, sufficient stress to shear the supplement is imparted thereto. The supplement thus becomes fluid in the immediate vicinity of the licker wheel and is carried thereon and presented to the animal. Consumption of the particular supplement by an animal is controlled by regulating one or more factors or combinations thereof such as the viscosity of supplement, the dilution of the palatable feed medium by the aqueous clay slurry or by the addition of sufficient amounts of a salt, such as, for example, ammonium sulfate, which is not highly palatable to the animals. Generally, said salts are incorporated into the supplement in amounts ranging from about 0.5 to about 10%, preferably from 0.5 to about 5.0% by weight of the supplement.

The invention will be more fully understood by the following illustrative embodiments thereof. In the examples, all parts represent parts by weight of the finished supplement unless otherwise indicated. Viscosity determinations were made with a Brookfield Viscosity Model LVT, unless otherwise indicated.

EXAMPLE 1

This example illustrates the preparation of aqueous clay slurry pre-mixes used in the present invention and the effects of varying amounts of and types of dispersant. The clays employed were attapulgite (Attagel 50, available from Engelhard Minerals and Chemicals Corporation, Menlo Park, N.J.) and bentonite (Volclay 55, available from American Colloid Company, 5100 Suffield Court, Skokie, Ill.).

The following 10% aqueous dispersions of the clays were prepared in a high shear mixer by agitating the clay in water containing various amounts of $Na_4P_2O_7$ and $Na_4P_2O_7 \cdot 10H_2O$ dispersants, respectively, as set forth below. Each of the clay mixtures were sheared in a Waring blender operated at 120 volts for about 5 minutes.

| A. | Attapulgite Clay % $Na_4P_2O_7$ (Based on Clay Weight) | Apparent Viscosity (CPS: 0.3 R.P.M.) |
|---|---|---|
| | 1.2 | 60,000 |
| | 1.8 | 50,000 |
| | 2.4 | 28,000 |
| | 3.6 | 8,000 |
| | 4.8 | 1,800 |
| | 6.0 | 1,900 |
| | 7.2 | 2,220 |

| B. | Bentonite Clay % $Na_4P_2O_7 \cdot 10H_2O$ (Based on Clay Weight) | Apparent Viscosity (CPS: 0.3 R.P.M.) |
|---|---|---|
| | 0 | 1,000,000 |
| | 10.0 | 9,200 |
| | 12.0 | 460 |
| | 14.0 | 200 |
| | 16.0 | 440 |

EXAMPLE 2

Various other 10% bentonite clay pre-mix slurries were prepared according to the procedures of Example 1 and the optimum amounts of dispersant necessary to produce a minimum slurry viscosity are set forth below for each clay.

| Run No. | Clay | % $Na_4P_2O_7$ (Based on Clay) | Viscosity (CPS: 0.3 RPM) |
|---|---|---|---|
| 1. | *Volclay 625 | 7.2 | 5,500 |
| 2. | *Volclay SPV 200 | 6.0 | 1,900 |
| 3. | *Volclay 90 | 7.2 | 400 |
| 4. | *Volclay 325 | 9.6 | 900 |
| 5. | *Volclay 55 | 8.4 | 200 |
| 6. | *Volclay KWK | 9.6 | 360 |
| 7. | **Aquagel | 7.2 | 2,700 |
| 8. | **Baroco | 6.0 | 27 |
| 9. | ***Volclay 625 | 12 | 5,500 |
| 10. | ***Volclay SPV | 10 | 1,900 |
| 11. | ***Volclay 90 | 10 | 2,000 |

*Volclays are products of American Colloid Co.
**Product of Baroid Division, National Lead Co.
***Dispersant was $Na_4P_2O_7 \cdot 10H_2O$ (based on clay)

EXAMPLE 3

15% Clay slurries of Volclay SPV 200 and Volclay 55 were similarly prepared according to the procedures of Example 1. The optimum amount of $Na_4P_2O_7 \cdot 10H_2O$ (based on clay) for Volclay SPV 200 was found to be 12%; the slurry had an apparent viscosity of about 100,000 cps (at 0.3 RPM). The optimum amount of $Na_4P_2O_7 \cdot 10H_2O$ (based on clay) for Volclay 55 was found to be 14%; the slurry had an apparent viscosity of about 110,000 cps (at 0.3 RPM).

EXAMPLE 4

Pre-mixes of an attapulgus clay (Attagel 50, available from Engelhard Minerals and Chemicals Corporation, Menlo Park, N.J.) were prepared at 30% solids with varying amounts of tetrasodium pyrophosphate (based on clay weight). The slurries were prepared as in Example 1 and the viscosities obtained with varying amounts of dispersants was determined.

| % $Na_4P_2O_7$ | Apparent Viscosity CPS; 0.3 RPM |
|---|---|
| 1 | 1,250,000 |
| 2 | 900 |
| 3 | 99,000 |
| 4 | 180,000 |
| 8 | 2,000,000 |

EXAMPLE 5

In procedures similar to those in Example 4 above, 3% $Na_4P_2O_7 \cdot 10H_2O$ (based on clay) was used to prepare 10, 20 and 30% clay slurries of Attagel 50, the viscosities (cps. at 0.3 RPM) of which were 15, 900 and 57,000, respectively.

EXAMPLE 6

The effect of shearing on the viscosity of the clay slurry pre-mix and upon the viscosity of a thickened molasses formulation was determined by shearing separate samples of a 12% Volclay 55 pre-mix containing an optimum amount (8.4%) of $Na_4P_2O_7$ (based on the clay) dispersant, for varying periods of time. The finished molasses formulation prepared from the 12% clay slurry pre-mix contained 80.3 parts of 1.350 density molasses, 16.7% of the 12% dispersant-treated clay slurry (2% clay in final formulation) and 3.0% of phosphoric acid (85.8%). The results are set forth in the following Table I.

TABLE I

| Waring Blender Shearing Time at 120 Volts (minutes) | Apparent Viscosity (cps, 0.3 RPM) of the Volclay 55 Pre-mix | Apparent Viscosity (cps, 0.3 RPM) of the Molasses Formulation |
|---|---|---|
| 0.25 | 5,000 | 21,000 |
| 0.5 | 7,000 | 28,200 |
| 1 | 10,000 | 30,500 |
| 2 | 17,000 | 38,700 |
| 4 | 17,100 | 48,000 |

The effect of increasing the amount of clay in the final formulation and shearing the slurry for a short period of time (0.25 minutes) is shown in the following Table II. The data indicate that a clay concentration of 2.5% in the formulation, which was sheared for 0.25 minutes, is about equivalent in thickening effectiveness to a clay slurry sheared for 4.0 minutes and present in the final formulation at a concentration of 2.0%.

TABLE II

| Percent Volclay 55 in the Formulation | Apparent Viscosity (cps, 0.3 RPM) of the Formulation |
|---|---|
| 2 | 21,000 |
| 2.5 | 47,000 |
| 3 | 77,000 |

In the following examples, the effect of the absence or presence of dispersant and organic acid and/or polyvalent cation source on the viscosity of a prepared solution is demonstrated.

EXAMPLE 7

Various solutions of sucrose and cane sugar molasses were mixed with 10% attapulgus clay (Attagel 50) slurries, with or without optimum amounts of tetrasodium pyrophosphate dispersant. The amounts of ingredients employed and the results obtained are set forth below.

| Run No. | Formulation | Clay Slurry | $Na_4P_2O_7$ (Based on Clay) | Water | Viscosity (CPS, 0.3 RPM) |
|---|---|---|---|---|---|
| 1. | 80 gm of 70 Brix Sucrose | 20 gm | 1.8% | 0 | 65 |
| 2. | 80 gm of 70 Brix Sucrose | 0 | 0 | 20 gm | 42 |
| 3. | 80 gm of 70 Brix Cane sugar molasses | 0 | 0 | 20 gm | 52 |
| 4. | 80 gm 70 Brix cane sugar molasses | 20 gm | 0 | 0 | 10,600 |
| 5. | 80 gm 70 Brix cane sugar molasses | 20 gm | 1.8% | 0 | 42,000 |

EXAMPLE 8

The formulation from Run No. 1 of Example 7 was treated with 0.03 grams of $CaCl_2$ and stirred. The viscosity of the treated formulation was found to be about 35,000 cps (at 0.3 RPM) and had a pH of about 5.5.

EXAMPLE 9

Example 7 was duplicated except that 10% bentonite (Volclay 55) clay slurries containing 14% tetrasodium pyrophosphate (based on clay weight) were employed. The results are as follows:

| Run No. | Formulation | Clay Slurry | $Na_4P_2O_7$ | Water | Viscosity (cps, 0.3 RPM) |
|---|---|---|---|---|---|
| 1. | 80 gm 70 Brix Sucrose | 0 | 0 | 20 gm | 42 |
| 2. | 80 gm 70 Brix Molasses | 0 | 0 | 20 gm | 52 |

-Continued

| Run No. | Formulation | Clay Slurry | Na₇P₂O₇ | Water | Viscosity (cps, 0.3 RPM) |
|---|---|---|---|---|---|
| 3. | 80 gm 70 Brix Sucrose | 20 gm | 14% | 0 | 110 |
| 4. | 80 gm 70 Brix Molasses | 20 gm | 14% | 0 | 52,500 |

EXAMPLE 10

The effect of supplement viscosity on consumption by cattle was determined by feeding cattle molasses supplements of varying viscosities and clay content. The compositions of the supplements fed and the results on consumption by increasing the supplement viscosity are set forth in the following Table III.

TABLE III

| Run No. | Formulation (%) Molasses | *Clay | Water | $H_3PO_4$ | Viscosity CPS at 0.5 RPM | No. Days Fed | Avg. Intake (Lb./Head Daily) Total | Molasses |
|---|---|---|---|---|---|---|---|---|
| 1. | 78.5 | 2.0 | 18.0 | 1.5 | 13,600 | 17 | 7.37 | 5.8 |
| 2. | 78.5 | 3.0 | 17.0 | 1.5 | 20,400 | 10 | 7.13 | 5.6 |
| 3. | 78.5 | 4.0 | 16.0 | 1.5 | 34,800 | 9 | 6.3 | 5.0 |
| 4. | 78.5 | 0 | 20.0 | 1.5 | 150 | 13 | 8.8 | 6.9 |

*Formulations of Runs 1–3 were prepared from Attagel 50 clay slurries of 10, 15 and 20% clay content, respectively; $Na_4P_2O_7$ was the dispersant employed in amounts of 0.2, 0.3 and 0.4% by weight of the slurry, respectively.

EXAMPLE 11

In similar procedures as set forth in the foregoing examples, the following complete supplements were prepared and fed to cattle free choice. The compositions of the supplements, days fed and consumption data are set forth in the following Table IV.

| Supplement No. Ingredients % | A 30% CPE* | B 60% CPE | C 30% CPE |
|---|---|---|---|
| ¹Kedlor 230 | 12.25 | 26.0 | — |
| Urea | — | — | 9.75 |
| ²Molasses | 60.75 | 48.0 | 58.5 |
| ³Clay Slurry   a) clay | 3.0 | 3.0 | 2.0 |
|                b) water | 17.0 | 12.0 | 18.0 |
| Water (additional) | — | — | 2.25 |
| Sulfur (elemental) | — | 1.0 | 0.5 |
| Calcium Chloride | — | — | 2.0 |
| Ammonium Sulfate | 2.0 | — | — |
| $H_3PO_4$ (80%) | 3.0 | 3.0 | 3.0 |
| NaCl | 2.0 | 2.0 | 1.0 |
| Propylene Glycol | — | 5.0 | 3 |
|  | 100.00 | 100.00 | 100.00 |
| Viscosity at 0.3 RPM | 45,000 | 150,000 | 28,000 |
| Average Consumption lb/head daily | 2.2 lb (99 head days) | 2.3 lb (100 head days) | 4.6 lb (60 head days) |

¹CPE = crude protein equivalent.
²Kedlor 230, a feed grade biuret available from The Dow Chemical Company, Midland, Michigan
³80 Brix, 1.392 density
⁴Supplements A and B prepared with Attagel 50 Attapulgite clay, the water contained 2% anhydrous sodium pyrophosphate (based on clay) Supplement C was prepared with Volclay 200 clay, the water contained 6% anhydrous sodium pyrophosphate (based on clay)

The above supplements were prepared by first forming a clay slurry pre-mix by dissolving the pyrophosphate dispersant in the water with minimum agitation provided by double speed marine propellers driven by an air motor. The required amount of clay was then slowly added under shearing conditions to the water. During the clay addition, the air motor (connected to a 60 psi air line) was operated at maximum speed so as to adequately shear the clay. Mixing was continued for about 20–30 minutes until complete dispersion of the clay was noted.

The prepared clay slurry pre-mix was then added to molasses contained in a mixing vessel equipped with a ½ HP *Lightning Mixer including a shearing impeller. While operating the shearing impeller at maximum RPM (rated value = 1728 RPM), the clay slurry pre-mix was added thereto and mixed for about 30 minutes. The $H_3PO_4$ was then added and the mixture sheared for an additional 5–10 minutes and a smooth, thickened, homogenous mixture was obtained. The feed grade biuret and other mixture was obtained. The feed grade biuret and other additives were then incorporated with sufficient mixing to adequately disperse the same in the thickened molasses preparation.

*Available from the Mixing Equipment Company

EXAMPLE 12

Liquid feed supplements containing 15% Kedlor brand feed grade biuret of varying mesh size were prepared with a 10% slurry of attapulgite clay (Attagel 50) containing 1.8% of $Na_4P_2O_7$ dispersant (based on the clay) and placed into retainer tubes of about 2 inches outside diameter and about 23 inches long. The tubes containing supplements were allowed to stand at rest for 30 days at about 73°F. Samples of the formulation were taken from 1 and 21 inch levels below the surface for nitrogen analysis to determine the stability of the prepared supplements. The results are set forth in the following Table V.

TABLE V

| Biuret Particle Size Range | Initial Viscosity cps (0.3 RPM) | % Attagel 50 | Depth Sample Taken | % N |
|---|---|---|---|---|
| 14 to +80 mesh | 64,000 | 2.0 | *retainer | 4.08 |
| 14 to +80 mesh | 64,000 | 2.0 | 1 inch | 4.24 |
| 14 to +80 mesh | 64,000 | 2.0 | 10 inches | 4.59 |
| 14 to +80 mesh | 64,000 | 2.0 | 21 inches | 4.30 |
| 14 to +80 mesh | 12,000 | 1.0 | retainer | 4.76 |
| 14 to +80 mesh | 12,000 | 1.0 | 1 inch | 4.18 |
| 14 to +80 mesh | 12,000 | 1.0 | 21 inches | 4.17 |
| 100 mesh | 44,000 | 1.8 | retainer | 5.94 |
| 100 mesh | 44,000 | 1.8 | 1 inch | 5.98 |
| 100 mesh | 44,000 | 1.8 | 21 inches | 6.02 |

*Retainer indicates Nitrogen analysis of sample taken on day 1

EXAMPLE 13

Molasses liquid feed supplements were prepared as follows:

| Ingredients | Percent |
|---|---|
| Molasses (80 Brix) | 51.4 |
| Water | 24.1 |
| [1]Clay | 3.0 |
| [2]Na$_5$P$_3$O$_{10}$ | 3.0 |
| (NH$_4$)$_2$SO$_4$ | 2.0 |
| NaCl | 1.0 |
| Minerals (trace) | 0.5 |
| Kedlor 230 (-60 to +100 mesh) | 12.0 |
| [3]Na$_5$P$_3$O$_{10}$ | 3.0 |
| | 100.0 |

Viscosity at 0.3 RPM 140,000 cps

[1]Attagel 50; 13.5% pre mix slurry (18,000 cps at 0.3 RPM)
[2]Clay dispersant
[3]Phosphorous source

EXAMPLE 14

A feed supplement was prepared to contain the following:

| Ingredients | Percent |
|---|---|
| Molasses (80 Brix) | 60.0 |
| Water | 30.8 |
| [1]Clay | 2.0 |
| (NH$_4$)$_2$SO$_4$ | 2.0 |
| NaCl | 1.0 |
| Minerals (trace) | 0.5 |
| [2]Ammonium polyphosphate | 3.7 |
| | 100.0 |

Viscosity (at 0.3 RPM) = 86,000 cps

[1]Attagel 350, 15% slurry pre mix, viscosity of 500,000 cps at 0.3 RPM. Contains 4% ammonium polyphosphate dispersant (based on clay).
[2]Phosphorous source While in the foregoing specification this invention has been described in relation to certain preferred embodiments thereof and many details have been set forth for purposes of illustration, it will be apparent to those skilled in the art of preparing liquid feed supplements that many of the details described herein can be varied considerably and that the invention is susceptible to many additional embodiments.

What is claimed is:

1. A thixotropic liquid animal feed supplement comprising water, a liquid feed supplement medium selected from the group consisting of molasses and a carbohydrate solution selected from the group consisting of starches, dextrins, pectins and sugars and containing at least about 0.5% by weight of a soluble acid or at least about 0.01% by weight of a polyvalent cation source, and from about 0.5 to about 5.0 percent by weight of a dispersant-treated clay, said clay being selected from the group consisting of bentonite, attapulgite and sepiolite clays and said dispersant being employed in amounts of from about 1 to about 20 percent by weight based on the clay and being selected from the group consisting of sodium, potassium and ammonium tripolyphosphate, pyrophosphate and polyphosphate and the sodium salt of polymeric carboxylic acids.

2. A supplement in accordance with claim 1, wherein the liquid feed supplement medium is a carbohydrate solution.

3. A supplement in accordance with claim 2 wherein the carbohydrate solution comprises an edible sugar solution.

4. A supplement in accordance with claim 3, wherein said edible sugar is selected from the group consisting of araginose, xylose, glucose, fructose, sucrose, maltose and lactose, or admixtures thereof.

5. A supplement in accordance with claim 3 wherein the edible sugar is sucrose.

6. A supplement in accordance with claim 5 wherein the soluble polyvalent cation source is calcium.

7. A supplement in accordance with claim 1 wherein the liquid feed supplement medium is molasses.

8. A supplement in accordance with claim 1 wherein said clay is attapulgite.

9. A supplement in accordance with claim 1 wherein said clay is bentonite.

10. A supplement in accordance with claim 1 wherein the dispersant of the treated clay comprises a soluble salt of metaphosphate, tripolyphosphate, pyrophosphate or a polyphosphate.

11. A supplement in accordance with claim 1 further comprising insoluble minerals or elements.

12. A supplement in accordance with claim 1 further comprising edible water-insoluble fats and oils.

13. A thixotropic liquid animal feed supplement comprising water, a liquid feed supplement medium selected from the group consisting of molasses and a carbohydrate solution selected from the group consisting of starches, dextrins, pectins and sugars and containing at least about 0.5% by weight of a soluble acid or at least about 0.01% by weight of a polyvalent cation source, a non-protein nitrogen source and from about 0.5 to about 5.0 percent by weight of a dispersant-treated clay, said clay being selected from the group consisting of bentonite, attapulgite and sepiolite clays and said dispersant being employed in amounts of from about 1 to about 20 percent by weight based on the clay and being selected from the group consisting of sodium, potassium and ammonium tripolyphosphate, pyrophosphate and polyphosphate and the sodium salt of polymeric carboxylic acids.

14. A supplement in accordance with claim 13 wherein the liquid feed supplement medium is a carbohydrate solution.

15. A supplement in accordance with claim 14 wherein the carbohydrate solution comprises an edible sugar solution.

16. A supplement in accordance with claim 15 wherein said edible sugar is selected from the group consisting of araginose, xylose, glucose, fructose, sucrose, maltose and lactose, or admixtures thereof.

17. A supplement in accordance with claim 15 wherein the edible sugar is sucrose.

18. A supplement in accordance with claim 17 wherein the soluble polyvalent cation source is calcium.

19. A supplement in accordance with claim 13 wherein the liquid feed supplement medium is molasses.

20. A supplement in accordance with claim 13 wherein said clay is attapulgite.

21. A supplement in accordance with claim 13 wherein said clay is bentonite.

22. A supplement in accordance with claim 13 wherein the dispersant of the treated clay comprises a soluble salt of a metaphosphate, tripolyphosphate, pyrophosphate or a polyphosphate.

23. A supplement in accordance with claim 13 wherein the non-protein nitrogen source is biuret.

24. A supplement in accordance with claim 13 wherein the non-protein nitrogen source is urea.

25. A supplement in accordance with claim 13 further comprising insoluble minerals or elements.

26. A supplement in accordance with claim 13 further comprising edible water-insoluble fats and oils.

* * * * *

UNITED STATES PATENT OFFICE
CERTIFICATE OF CORRECTION

Patent No. 3,901,976      Dated August 26, 1975

Inventor(s)  Harold H. Roth et al.

It is certified that error appears in the above-identified patent and that said Letters Patent are hereby corrected as shown below:

In the Abstract, line 1, "and" should read -- are --; line 19, "diary" should read -- dairy --. Column 2, line 64, "diary" should read -- dairy --. Column 3, line 53, "homogeneous" should read -- homogenous --. Column 12, lines 60 through 67, insert a minus (-) sign before each entry under the column titled "Biuret Particle Size Range" (Example: -14 to +80 mesh). Column 14, line 20, "of metaphosphate" should read -- of a metaphosphate --.

Signed and Sealed this

Thirteenth Day of July 1976

[SEAL]

Attest:

RUTH C. MASON
Attesting Officer

C. MARSHALL DANN
Commissioner of Patents and Trademarks